(12) United States Patent
Engel et al.

(10) Patent No.: US 8,466,916 B2
(45) Date of Patent: Jun. 18, 2013

(54) SYSTEM AND METHOD FOR IN-CONTEXT VOLUME VISUALIZATION USING VIRTUAL INCISION

(75) Inventors: Klaus Engel, Donauwörth (DE); James Williams, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 604 days.

(21) Appl. No.: 11/675,135

(22) Filed: Feb. 15, 2007

(65) Prior Publication Data

US 2007/0195088 A1    Aug. 23, 2007

Related U.S. Application Data

(60) Provisional application No. 60/775,193, filed on Feb. 21, 2006.

(51) Int. Cl.
*G06T 17/00* (2006.01)
(52) U.S. Cl.
USPC .......................................... 345/424; 345/427
(58) Field of Classification Search
USPC ....................................................... 345/424
See application file for complete search history.

(56) References Cited

PUBLICATIONS

Markus Hadwiger, Christoph Berger, Helwig Hauser, "High-Quality Two-Level Volume Rendering of Segmented Data Sets on Consumer Graphics Hardware", Oct. 24, 2003, Proceedings of the 14th IEEE Visualization Conference, pp. 301-308.*
Matus Straka, Michal Cervenansky, Alexandra La Cruz, Arnold Kochl, Milos Sramek, Eduard Groller, Dominik Fleishmann, "The VesselGlyph: Focus & Context Visualization in CT-Angiography", Oct. 15, 2004, IEEE Visualziation 2004, pp. 385-392.*
Armin Kanitsar, Dominik Fleishmann, Rainer Wegenkittl, Petr Felkel, Meister Eduard Groller, "CPR—Curved Planar Reformation", Nov. 1, 2002, IEEE Visualization 2002.*
M. S. T. Carpendale, D. J. Cowperthwaite, F. D. Fracchia, "Distortion Viewing Techniques for 3-Dimensional Data", 1996, IEEE, Porceedings of the 1996 IEEE Symposium on Information Visualization (INFOVIS '96).*
M. S. T. Carpendale, D. J. Cowperthwaite, F. D. Fracchia, "Extending Distortion Viewing from 2D to 3D", Jul. 1997, IEEE, IEEE Computer Graphics and Applications, vol. 17, Issue 4.*
Edward Angel, "Interactive Computer Graphics—A Top-Down Approach Using OpenGL", 2003, Addison-Wesley, Third Edition, p. 571.*
Michael J. McGuffin, et al. "Using Deformations for Browsing Volumetric Data," Department of Computer Science, University of Tornoto.

(Continued)

*Primary Examiner* — Ulka Chauhan
*Assistant Examiner* — Robert Bader
(74) *Attorney, Agent, or Firm* — Donald B. Paschburg; F. Chau & Associates, LLC

(57) ABSTRACT

A method for volume rendering a digitized medical image includes providing a digitized medical image volume comprising a plurality of intensities on a 3-dimensional grid of points, providing a projection plane comprising a 2-dimensional lattice of points onto which rendering rays are projected from a viewing point through the image volume, advancing a sampling point along a ray through the image volume, generating an incision region within the image volume, determining whether the sampling point is within the incision region, where a first transfer function is applied to a sample value interpolated from a first volume if the sampling point is within the incision region, and a second transfer function is applied to a sample value interpolated from a second volume if the sampling point is outside the incision region, and accumulating the output of the transfer function.

29 Claims, 5 Drawing Sheets

PUBLICATIONS

Ivan Viola, et al., "Importance-Driven Focus of Attention," IEEE Transactions of Visualization and Computer Graphics, vol. 12, No. 5, Sep./Oct. 2006.

C. Rezk-Salama, et al., "Fast Volumetric Deformation on General Purpose Hardward," Computer Graphics Group, University of Erlangen-Nuremberg, Germany.

Jens Kruger, et al., "Clear View: An Interactive Context Preserving Hotspot Visualization Technique."

Bonn. Computer—Tomographie, Seminar WS 1999/2000: Robotik in der Medizin, Univ. Karlsruhe (TH), Inst. fur Prozessrechentechnik u. Robotik, (pp. 1-23), Bibliographie; Magazine.

Jahnke. 3D Exploration von Volumendaten, Rheinische Friedrich-Wilhelms-Universitat Bonn, Diplomarbeit, 1998, Seiten: Titelseiten, I-IV (pp. 1-119); Magazine.

\* cited by examiner

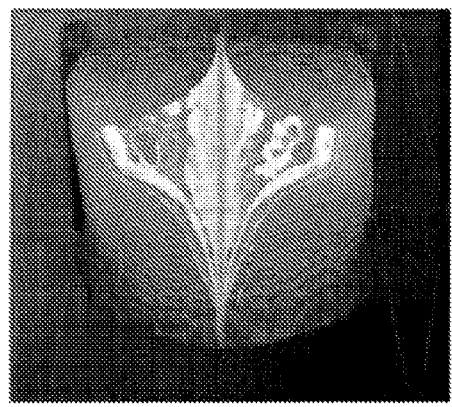 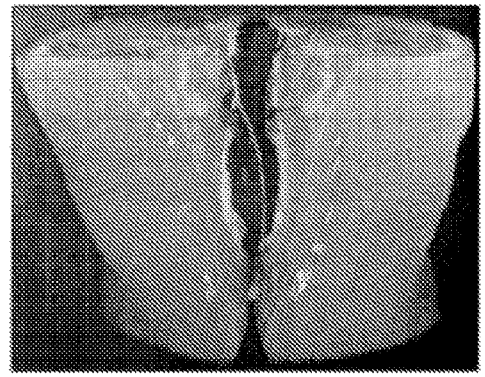
FIG. 1(a)  FIG. 1(b)
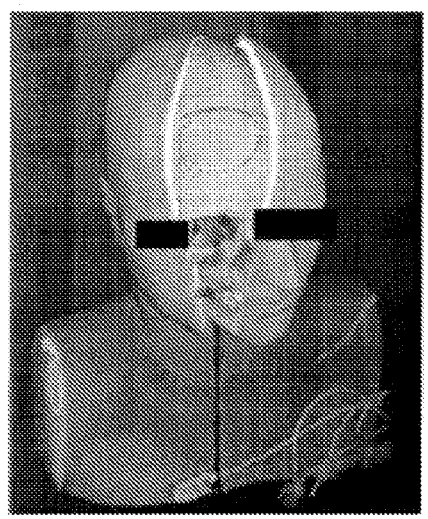
FIG. 2

SYSTEM AND METHOD FOR IN-CONTEXT VOLUME VISUALIZATION USING VIRTUAL INCISION

CROSS REFERENCE TO RELATED UNITED STATES APPLICATIONS

This application claims priority from: "AN EFFICIENT DISPLAY TECHNIQUE FOR VIRTUAL INCISION USING PROCEDURAL OPENING AND DEFORMATION FOR IN-CONTEXT VOLUME VISUALIZATION", U.S. Provisional Application No. 60/775,193 of Engel, et al., filed Feb. 21, 2006, the contents of which are incorporated herein by reference.

TECHNICAL FIELD

This disclosure is directed to volume rendering, in particular to in-context volume visualization of the interior of a volumetric image.

DISCUSSION OF THE RELATED ART

The underlying principle of direct volume rendering is to sample a volume dataset along rays in an arbitrary direction and to blend these samples together in a frame buffer. Before being blended, the densities read in the volume are converted to colors (RGBA) with a transfer function that is often encoded as a lookup table. For this reason, the blending is often referred to as alpha-blending. When a sufficient quantity of samples are involved, the result is a seamless image.

There exist several techniques to reveal the inside of a volume. One option is to employ transfer functions, which map density values from the volume to color and opacities. By using very low or zero opacity for density values of occluding structures, these occluding structures can be made transparent or completely removed in the resulting images. However, by removing occluding features using the transfer function, the context surrounding an important feature is lost. Moreover, other important features that have similar density values as occluding structures will also be removed.

Another common method to remove occluding material is to segment important features and remove fragments that are not within the segmented parts of the volume. Similar to transfer functions, the context surrounding the segmented feature is lost by using such a technique. In importance-driven visualization, material occluding an important feature that has been segmented is cut away during rendering. Often, however, it is necessary to browse a volume to search for an important feature that has not yet been segmented. Consequently, importance-driven visualization cannot be applied in this case.

Clipping planes are another common approach to reveal features embedded inside a volume data set. All fragments in one of the two half-spaces defined by the clipping plane are removed. Clip geometries allow removal of the inside or the outside of a given arbitrary geometry.

SUMMARY OF THE INVENTION

Exemplary embodiments of the invention as described herein generally include methods and systems for virtual incision rendering that allows visualization of certain anatomical features in the data set in the context of other information. For example, a fractured bone can be shown in the context of bleeding in the surrounding tissue, whereas in traditional volume rendering the surrounding tissue with the bleeding would be lost because a transfer function that shows only bone would be used. According to an embodiment of the invention, the incision area is defined using a virtual incision plane and the distance to viewing point in space. Fragments close to the incision plane and to the viewing point are removed or rendered using a different transfer function. Since it is easy to evaluate the distance of a fragment to the area during rendering, the parameters controlling the area can be changed interactively. Furthermore, the volume surrounding the area can be deformed on-the-fly. Since the interior of the volume can be revealed using a procedural approach, it is possible to evaluate during rendering if a fragment is inside or outside the incision area as well as how close the fragment is to the incision area. Consequently, the shape, position, orientation, size and all other parameters describing the incision area can be changed interactively. The boundary of the incision area can be rendered using a different transfer function. In addition, a curved multi-planar reconstruction (MPR) can be shown on the boundary surface of the incision area. A method according to an embodiment of the invention can be used to visualize details contained within the data set in the context of the surrounding structures, which usually either occlude important features or which are completely removed during rendering using transfer functions, segmentation masks, clipping planes or clipping geometries.

According to an embodiment of the invention, there is provided a method for volume rendering a digitized medical image, including providing a digitized medical image volume, said image comprising a plurality of intensities on a 3-dimensional grid of points, providing a projection plane comprising a 2-dimensional lattice of points onto which rendering rays are projected from a viewing point through said image volume, advancing a sampling point along a ray through said image volume, generating an incision region within said image volume, determining whether said sampling point is within said incision region, wherein a first transfer function is applied to a sample value interpolated from a first volume if said sampling point is within the incision region, and a second transfer function is applied to a sample value interpolated from a second volume if said sampling point is outside the incision region, and accumulating the output of the transfer function.

According to a further aspect of the invention, the incision region is a plane of finite thickness parallel to the ray direction, and determining whether said sampling point is within the incision region comprises evaluating a product of the position of the sampling point with an equation representing the incision plane.

According to a further aspect of the invention, the incision region is a sphere of finite radius within said image volume, and determining whether said sampling point is within the incision region comprises evaluating a distance of the position of the sampling point to the center point of the sphere.

According to a further aspect of the invention, the first volume and said second volume are the same.

According to a further aspect of the invention, the method comprises determining whether said sampling point is on a boundary of said incision region.

According to a further aspect of the invention, the method comprises applying a third transfer function to a sample value interpolated from a volume about said sampling point, if said sampling point is sufficiently close to said boundary.

According to a further aspect of the invention, the method comprises interpolating an output on the boundary of said incision region from the output of said first transfer function and the output of the second transfer function.

According to a further aspect of the invention, the output of the first transfer function either discards or makes the intensities of the first volume transparent with respect to the intensities of the second volume.

According to a further aspect of the invention, the first transfer function deforms the volume about the sampling point $\vec{x}$ according to the transformation $$\Phi^{-1}(\vec{x}) = \vec{x} + \sum_{i,j,k \in \{0,1\}} a_{ijk}(\vec{x}) \cdot (-\vec{t}_{ijk})$$

determined by trilinear interpolation of translation vectors $\vec{t}_{ijk}$ given at the vertices of a grid sub-volume about said sampling point, and interpolation weights $a_{ijk}$ obtained from the undeformed image volume grid According to a further aspect of the invention, the method comprises performing a curved MPR visualization at said incision boundary.

According to a further aspect of the invention, the method comprises changing a viewing distance for said curved MPR visualization between rendering frames.

According to a further aspect of the invention, the method comprises changing parameters characterizing said incision region during rendering, wherein said parameters include position and orientation of said incision region with respect to the viewing point, and the shape and size of said incision region.

According to another aspect of the invention, there is provided a method of volume rendering a digitized medical image including providing a digitized medical image volume, said image comprising a plurality of intensities on a 3-dimensional grid of points, projecting a ray from a viewing point through said image volume onto a 2-dimensional projection plane wherein a sampling point is advanced along said ray, generating an incision region within said image volume by providing parameters characterizing said incision region, wherein said parameters include position and orientation of said incision region with respect to the viewing point, and a shape and size of said incision region, and calculating a distance from said sampling point to a boundary of said incision region.

According to a further aspect of the invention, the method comprises using said distance to determine which of a plurality of sub-volumes contains said sampling point, wherein each of said plurality of sub-volumes is associated with a transfer function, and applying the transfer function associated with the sub-volume containing said sampling point to a sample value interpolated from said sub-volume, and accumulating the output of the transfer function along said ray.

According to a further aspect of the invention, the method comprises interpolating the output of the plurality of transfer functions between said sub-volumes.

According to another aspect of the invention, there is provided a program storage device readable by a computer, tangibly embodying a program of instructions executable by the computer to perform the method steps for volume rendering a digitized medical image.

BRIEF DESCRIPTION OF THE DRAWINGS

FIGS. 1(a)-(b) illustrate metaphors for a virtual incision method according to an embodiment of the invention.

FIG. 2 depicts a virtually opened head in a CT image, according to an embodiment of the invention.

DETAILED DESCRIPTION OF THE EXEMPLARY EMBODIMENTS

Figure 3A:
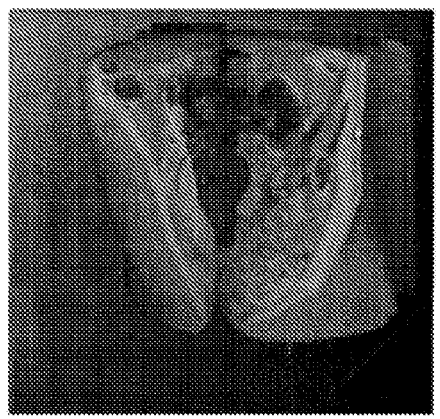
FIGS. 3(a)-(d) show direct volume renderings of an abdomen CT data set with procedural opening of the data set using a virtual incision plane, according to an embodiment of the invention.

Exemplary embodiments of the invention as described herein generally include systems and methods for in-context volume visualization. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, a method for in-context visualization is provided to reveal the inside of the volume by procedurally cutting it open. A first metaphor used within this context is cutting a volume to reveal the interior similar to an incision during a real surgery. This is achieved by applying a procedural opening and/or deformation during rendering. A virtual incision area is computed on-the-fly. The inside of the area can either be discarded or rendered using a transfer function different from the transfer function employed for the remainder of the volume. The inside of the incision area can be shifted outside, resulting in deformation similarly to a deformation of tissue in a real surgery. A second metaphor used within this context is interpreting volume data set as a book that can be virtually opened and browsed.

These metaphors are illustrated by FIGS. 1(a)-(b). FIG. 1(a) illustrates virtual incision by opening a volume similar to a book. FIG. 1(b) illustrates how volume slices become the pages of the book that can be browsed and turned over.

Methods to generate a two-dimensional image from volumetric data can roughly be classified into indirect and direct volume rendering techniques. While indirect methods generate and render an intermediate representation of the volume data, direct methods display the voxel data by evaluating an optical model which describes how the volume emits, reflects, scatters, absorbs and occludes light. The voxel values are mapped to physical quantities which describe light interaction at the respective points in 3D-space. During image synthesis the light propagation is computed by integrating light interaction effects along viewing rays based on the optical model. The corresponding integral is known as the volume rendering integral. Hardware-accelerated methods that employ texture-mapping hardware provide high frame rates and thus interactivity.

Interpolated volume data values are usually not rendered directly. Instead, a transfer function usually maps data values to colors and opacities. In the context of texture-based volume visualization, intermediate color and opacity values generated during volume rendering are called "fragments". By blending many fragments along straight rays through the volume, the final output color for a pixel on the screen in computed. Depending on the opacity values in the transfer function specified by the user, parts of the volume become visible, transparent or invisible. The inside of the volume is usually revealed during rendering by employing transfer functions which map material that occludes important features inside the volume to zero opacity. This however makes it impossible to see important features in the context of the surrounding material. The surrounding material, however, might provide important clues on how the feature is embedded inside the volume.

Options for removing occluding features include clip planes, arbitrary clip geometries and segmentation masks. Clip planes remove all voxels in one of the two half-spaces defined by the plane. Clip geometries allow cutting away voxels inside or outside of the geometry, thus providing higher flexibility than clip planes. Segmentation masks provide per-voxel tags, which allow rendering voxels with a particular tag value with a different transfer function or discard such voxels entirely.

All these techniques remove occluding features, or at least make occluding features more transparent. Thus the context in which the occluded important feature is embedded is lost or at least less well-defined.

Importance-driven visualization methods prevent important features from being occluded by less important features by providing a per-voxel importance tag. Voxels with low importance are removed on-the-fly during rendering only if they occlude voxels with higher importance. Material is removed dynamically depending on the viewing direction, allowing for the visualization of important features in the context of the surrounding material. Especially for interactive volume rendering, this improves the understanding of how features are embedded in the volume data.

Importance-driven visualization requires important features to be classified using segmentation algorithms, i.e. the importance of features must be pre-computed by usually "expensive" segmentation algorithms. In contrast to common importance-driven in-context visualization algorithms, a method according to an embodiment of the invention does not require any segmentation information.

An in-context visualization according to an embodiment of the invention makes use of a virtual incision. The term "virtual incision" refers to revealing the inside of a volume by virtually cutting it open by either discarding fragments inside the incision area (cutting away material), shifting fragments inside the incision area outside (deforming material), or using a different transfer function in the incision area (making material transparent). The virtual incision area inside the volume is defined procedurally, i.e. there exists no explicit representation of the shape of the incision area in memory. Instead the incision area is determined during rendering "on-the-fly" using a geometric approach. The incision area can be defined using any geometry, like a sphere, cube, cylinder, etc. For the purposes of clarity of exposition, an embodiment of the invention employing a virtual incision plane will be described. However, it is to be understood that a virtual incision plane embodiment is exemplary and non-limiting, and those skilled in the art will understand how to apply the teachings described herein below to other virtual incision geometries.

When using a virtual incision plane, the distance to this plane and the viewing point (or any other point in space) determines if a fragment is inside or outside of the incision area. The incision procedure computes the distance to the incision area, and one obtains negative distances values if the sampling position is inside the incision area and positive distances if the sampling position is outside. The plane defines the cut direction of the virtual incision while the viewing position or other point in space define the origin from which the virtual incision is performed. During rendering it is simple to determine whether any 3D point inside the volume is inside or outside the incision area, since the incision area is defined procedurally.

Fragments inside the incision area can either be discarded or rendered using a 2nd transfer function. FIG. 2 depicts an example of a virtually opened head in a CT image, where the fragments inside the incision area are rendered using a transfer function that shows the bone, while the fragments outside the incision area are rendered using a transfer function that shows skin.

Figure 3C:
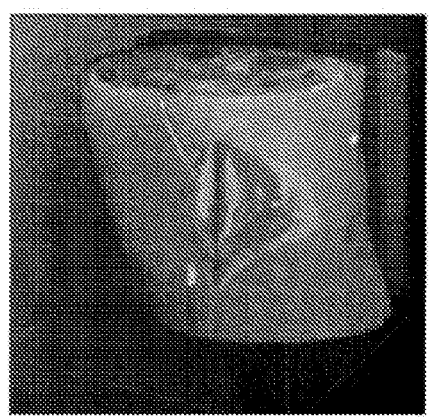
Figure 3B:
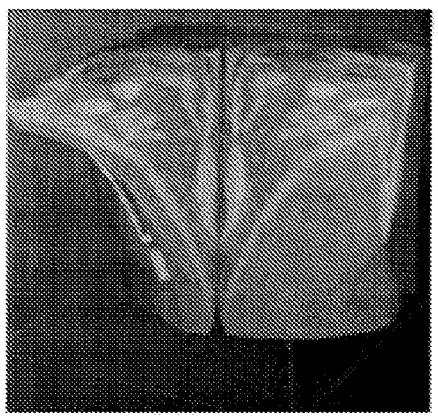
Figure 3D:
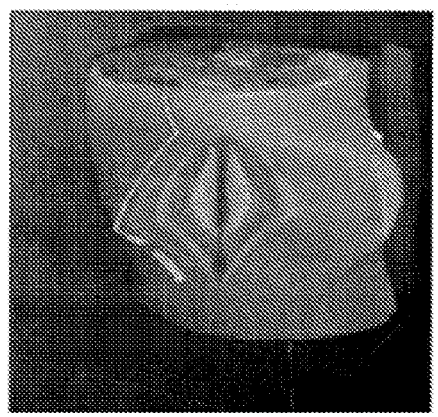

FIGS. 3(a)-(d) depict examples of direct volume renderings of an abdomen CT data set with procedural opening of the data set using a virtual incision plane, where fragments inside the incision area are discarded, according to an embodiment of the invention. In FIG. 3(a), no deformation has been applied to the volume, i.e. volume data inside the incision area is clipped. In FIG. 3(b), a deformation has been applied to the volume, i.e. volume data inside the incision area is shifted outside the incision area. FIGS. 3(c) and (d) respectively correspond to FIGS. 3(a) and (b), except that both use a virtual incision plane with restricted incision length.

Figure 4A:
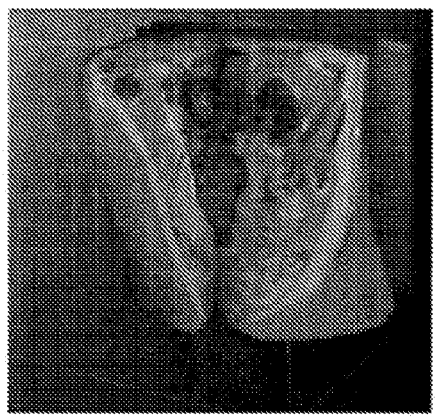
FIGS. 4(a)-(d) show further direct volume renderings of an abdomen CT data set with procedural opening of the data set using a virtual incision plane, according to an embodiment of the invention.
Figure 4B:
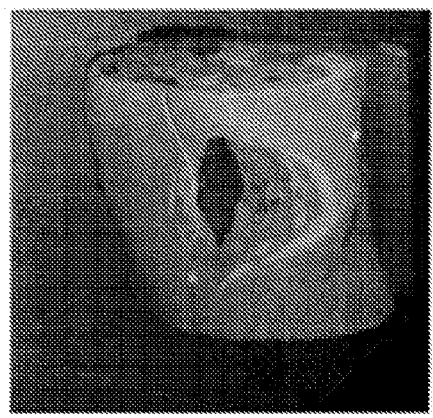
Figure 4C:
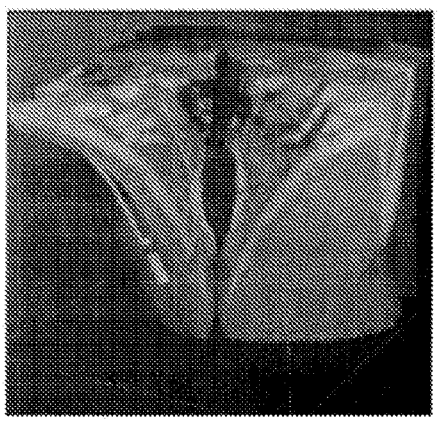
Figure 4D:
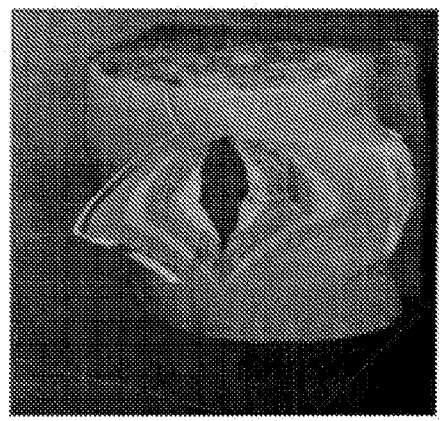
Figure 5A:
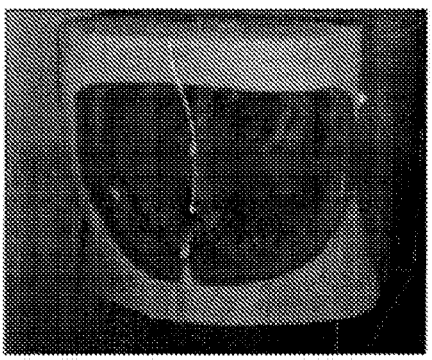
FIGS. 5(a)-(b) show renderings of curved multi-planar reconstructions (MPRs) on the boundary of the virtual incision, according to an embodiment of the invention.
Figure 5B:
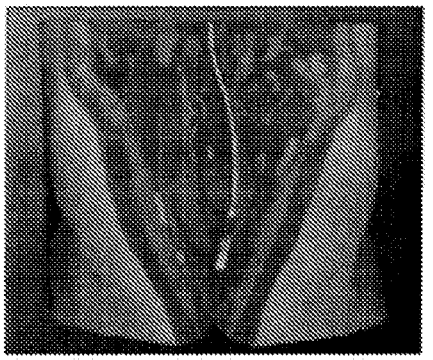

FIGS. 4(a)-(d) show further variations of direct volume renderings of an abdomen CT data set with procedural opening of the data set using a virtual incision plane, where an arterial aneurysm is visualized inside the incision area. In FIG. 4(a), no deformation has been applied to the volume, i.e. volume data inside the incision area is rendered using a $2^{nd}$ transfer function. FIG. 4(b) uses a virtual incision plane with a restricted incision length. Again, no deformation has been applied to the volume, i.e. volume data inside the incision area is rendered using a $2^{nd}$ transfer function. In FIG. 4(c), a deformation has been applied to the volume, i.e. volume data inside the incision area is shifted outside the incision area. Volume data inside the incision is rendered using a $2^{nd}$ transfer function. FIG. 4(d) also uses a virtual incision plane with a restricted incision length. Again, a deformation has been applied to the volume, so that volume data inside the incision area is shifted outside the incision area, and inside the incision the same volume data is rendering using a $2^{nd}$ transfer function.

Fragments originating from the inside of the incision area can be alternatively shifted outside the incision area using a procedural deformation. This is similar to the situation in a real surgery, for example during a cardio bypass operation where the sternum is cut open to reveal the chest. The tissue originating from the incision area is shifted away from the cut region. This deformation is also computed on-the-fly, i.e. there is no explicit representation of the deformation in memory. Instead of shifting fragments away from the incision area, texture coordinates for fragments outside the incision area are modified in such a way, that data values from the inside of the incision area are accessed, using an inverse of the deformation mapping.

In one exemplary deformation model, a volume object is first subdivided into a set of sub-cubes. The deformation is specified by translating the coordinates for each vertex of this model. The resulting translation of a point $\vec{x}$ in the interior of a sub-cube is determined by trilinear interpolation of the translation vectors $\vec{t}_{ijk}$ given at the vertices. The result is a trilinear mapping $$\Phi(\vec{x}) = \vec{x} + \sum_{i,j,k \in \{0,1\}} a_{ijk}(\vec{x}) \cdot \vec{t}_{ijk},$$

with the interpolation weights $a_{ijk}$ obtained from the original undeformed grid. Further, to allow user to be able to pick a vertex and drag it to an arbitrary position, the inverse transformation $\Phi^{-1}$ is required. Since, the inverse of a trilinear mapping in general is not again a trilinear mapping, but a function of higher complexity, a good approximation to the inverse mapping can be obtained by simply negating the original translation vectors, $$\Phi^{-1}(\vec{x}) = \vec{x} + \sum_{i,j,k \in \{0,1\}} a_{ijk}(\vec{x}) \cdot (-\vec{t}_{ijk})$$

with an approximation error for a maximum deformation magnitude $\gamma$ of order $O(\gamma^2)$. According to an embodiment of the invention, this inverse mapping can be performed procedurally, and no pre-defined deformation volume is required.

FIG. 3(b) shows a deformation of the volume using modified texture coordinates, which are obtained by computing shift-vectors orthogonal to the incision plane. The incision length can be optionally limited to for a result that is even closer to the result of an incision during a surgery, as shown in FIGS. 3(c), 3(d), 4(b), and 4(d).

Due to the procedural definition of the incision plane, the incision area can be updated dynamically, i.e. the position and orientation of the incision area be modified interactively for each frame, where a frame is one rendering output image, wherein rays for all pixels have been computed. One option is to position the incision plane to be always parallel to the viewer line of sight. Consequently, the incision plane will have a fixed position and orientation with respect to the viewing position and orientation. By rotating the volume, the user can browse the inside of the volume.

Another option is to allow the user to freely position and rotate the incision plane. In addition, the incision area can be modified by changing other parameters that define the incision area, such as apex, curvature, length, opening angles, etc.

The procedural definition of the incision area is useful in that for each point inside the volume, the distance to the incision area can be easily computed. This allows additional effects, such as rendering the boundary of the incision area with a different transfer function, smoothly interpolating the transfer functions from inside and outside the incision area on the incision area boundary, and enabling a curved MPR visualization on the boundary of the incision area. As previously stated, a negative distance value implies that the sampling position is inside the incision area and a positive distance value implies the sampling position is outside. A value of zero means that the sampling position is on the boundary of the incision area, thus one can easily have a curved MPR if an MPR-like transfer function is applied to points sufficiently close to the boundary, e.g., if abs(d–D)<epsilon, where epsilon is half the thickness of the curved MPR area, d is the distance of the current sampling position to the incision area and D is the distance to the incision area at which the curved MPR shall be rendered. A curved MPR can be rendered at any distance D from the incision area (e.g. an incision plane). By changing this distance D between frames one can obtain an effect of turning over the MPR like a page of a book.

According to an embodiment of the invention, the ease of computing the distance to the incision area for each point inside the volume allows the use of multiple transfer functions. One can render different volumes with different transfer functions based on certain ranges of distances to the incision area, for example:

0<distance<=0.1: render volume1/transferfunction1;
0.1<distance<=0.2: render volume2/transferfunction2;
0.2<distance<=0.5: render volume3/transferfunction3;
0.5<distance<=0.7: render volume4/transferfunction4.

The transfer functions can also be interpolated between the ranges.

Figure 6:
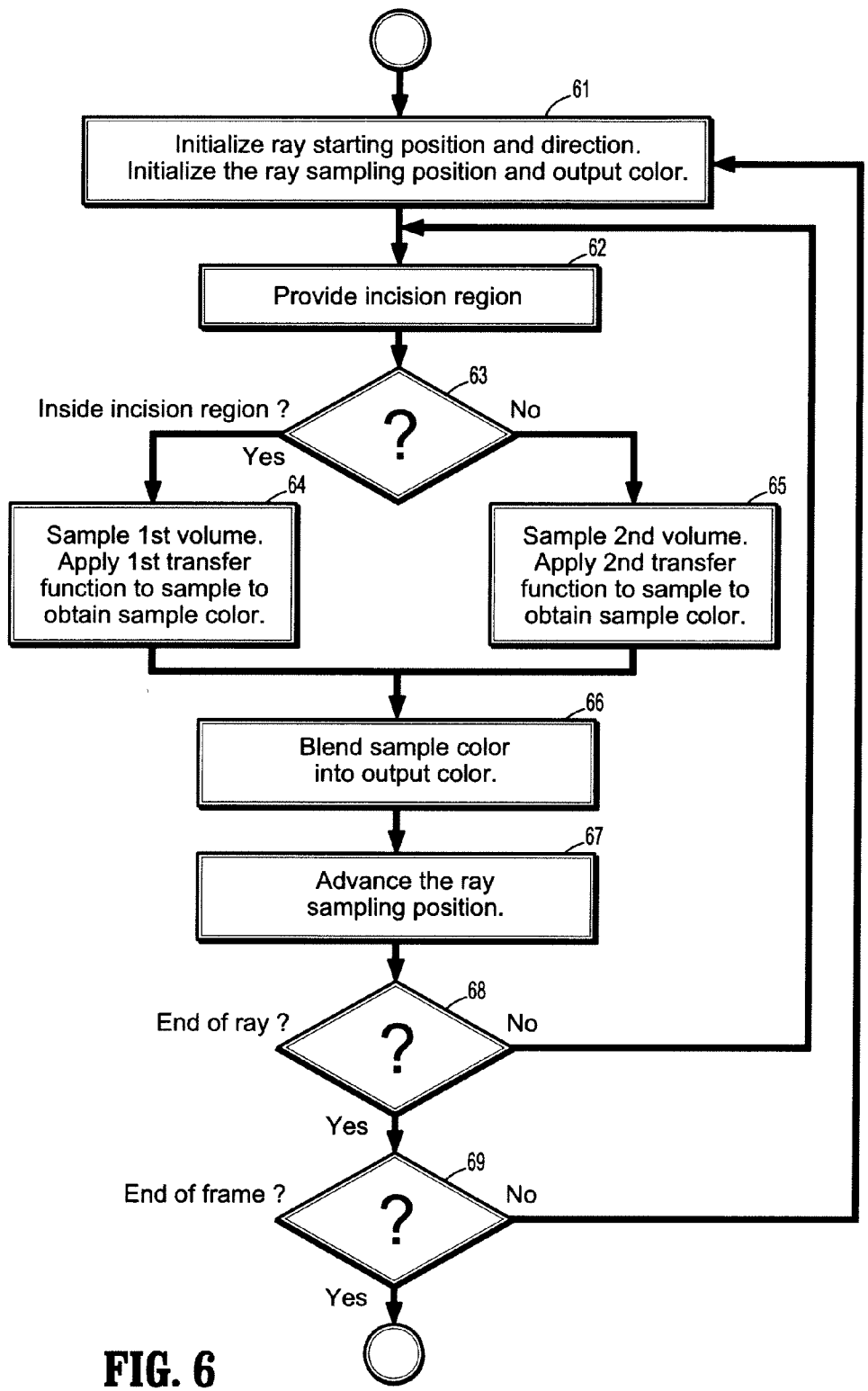
FIG. 6 is a flowchart of a virtual incision method for in-context volume visualization, according to an embodiment of the invention.

A flowchart an exemplary, non-limiting implementation of a virtual incision volume rendering of an embodiment of the invention is shown in FIG. 6. In this non-limiting example, the incision region can be either a plane parallel to the current view direction or a sphere about a sampling point. Referring now to the figure, given a 3-dimensional image volume to render, a 2-dimensional image projection plane is provided onto which rays will be projected from a viewing point. Looping over each pixel in the image plane, a starting position and direction are defined for a ray being projected to a pixel at step 61. The sampling position is initialized to the starting position, and the ray output color is initialized.

At step 62, an incision region is provided. The characteristics of the incision region can be determined dynamically during the rendering, so that the determination of whether a sampling point is within the incision region is procedural. Then at step 63, it is determined whether the current sampling position is inside the incision region. According to this embodiment of the invention, this determination is implemented in a Boolean function that returns TRUE or FALSE, and takes as arguments the current sampling position, the type of incision, and the parameters associated with the incision type for making the determination. Exemplary pseudocode for this Boolean function is as follows.

```
// function that procedurally checks
// if a sample is inside the incision region
Float planeIncisionThickness = 0.2
Boolean insideIncision( samplingPosition,// Vector
```

```
            type,             // Enum
            planeEquation,    // Vector
            spherePosition,   // Vector
            sphereRadius)     // Scalar
{
    if (type == PLANE) {
        // hard coded plane (can be a parameter)
        if (dot(samplingPosition, planeEquation)
                    < planeIncisionThickness)
            return TRUE;
        else
            return FALSE;
    }
    else if (type == SPHERE) {
        d = samplingPosition − spherePosition;
        if (sqrt(dot(d, d)) < sphereRadius)
            return TRUE;
        else
            return FALSE;
    }
    else // other incision types
}
```

This function illustrates exemplary tests for two types of incision regions: a plane and a sphere. In general, these tests involve calculating a distance from the sampling point to a point on a boundary surface. Typically, a negative distance value implies the sampling position is inside the incision region, a positive distance implies the sampling position is outside the region, and a value close to zero implies the sampling position is on or near the boundary of the incision region. One skilled in the art can easily implement tests for other types of incision regions. Note that in an alternative implementation, the functions tested in the Boolean condition, i.e. sqrt(dot(samplingPosition-spherePosition,samplingPosition-spherePosition)) for the sphere, and dot (samplingPosition, planeEquation) for the plane, could be passed as parameters instead of the planeEquation, spherePosition and sphereRadius variables.

If the current sampling position is inside the incision region, a first volume within the incision are is sampled to obtain a tri-linearly interpolated value at the current ray sampling position, and this interpolated value is passed to a first transfer function at step 64 to obtain a sample color. Otherwise, a second volume is sampled and the obtained value is passed to a second transfer function at step 65 to obtain the sample color. In an alternative embodiment of the invention, a volume is sampled before the incision region determination is made, in which case the same sample is used with different transfer functions for obtaining the sample color. Appropriate transfer functions can perform any of the virtual incisions described above, such as discarding fragments, deforming material, making material transparent, and additional effects such as the MPR visualization on the boundary of the incision region. A third transfer function can optionally be applied is the sampling point is on or sufficiently close to the incision region boundary.

At step 66, the sample color is blended into the ray output color, and at step 67, the sampling position is updated along the ray direction.

At step 68, it is determined whether the end of the ray has been reached. If not, the rendering returns to step 63 to test the updated sampling position, otherwise, it is determined at step 69 whether the frame has been completely rendered. If not, the rendering returns to step 61 to re-initialize the ray starting position and direction for another pixel, otherwise, the rendering terminates.

It should be noted that the code that checks for inside/outside the incision region is procedural (e.g., the function "insideIncision"), i.e. there is no data structure that describes the incision region. Instead there is a mathematical formula evaluated in "insideIncision". There can be many incision types, with simple planar and a simple spherical incisions being included in the above pseudo code.

The procedural definition of the incision regions according to an embodiment of the invention allows a user to freely position and rotate the incision region, and to modify incision region by changing those parameters that define the incision region, such as apex, curvature, length, opening angles, etc. This can be done interactively by the user either while a frame is being rendered, or between frames. In addition, a procedural definition of a virtual incision according to an embodiment of the invention does not require segmentation information.

According to another embodiment of the invention, as an alternative to the procedural definition of the incision, it is possible to generate a geometric representation for the boundary of the incision area, by computing a polygonal model representing the boundary of the incision area. For a model with a convex clipping geometry, a dual-depth buffer approach is often used. The first depth buffer stores for each pixel the depth of the first intersection of the ray from the projection plane through a pixel in the model, i.e., when the ray enters the model geometry. The second depth buffer stores the depth of the 2nd intersection of the ray through a pixel in the model, i.e., when the ray exits the model. To discard (clip) the inside of the convex clipping geometry, one can discard those sampling points which have a depth larger than the value stored in the first depth buffer and smaller than the value stored in the 2nd depth buffer. For a closed non-convex clipping geometry, techniques exist that determine if the current sampling position is inside (or outside) the clipping geometry. This can be achieved by counting the number of intersections of arbitrary rays shot from the current sampling position with the geometry. If the number of intersections is even, then the current sampling position is inside the (non-convex) clipping geometry, otherwise it is outside. This test can be implemented using graphics hardware by counting the number of intersections of rays along the current viewing direction using a stencil buffer. These approaches, however, require a re-computation of the incision area boundary geometry if incision area parameters, such as curvature and opening, etc., change.

The deformation of the material outside the incision area can also be achieved using a deformation volume. Instead of procedurally deforming the volume on-the-fly, a deformation volume is created in a pre-processing step that stores offset texture coordinates for the lookup into the un-deformed volume texture. Again, however, this approach requires a re-computation of the deformation volume once incision area parameters, such as curvature, opening, etc. change.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

An application program implementing an embodiment of the invention can be written in any suitable computer language. However, at least one embodiment of the is adaptable to being implemented to execute on a graphics processing unit (GPU) using the OpenGL Shading Language (GLSL) as a source language.

Figure 7:
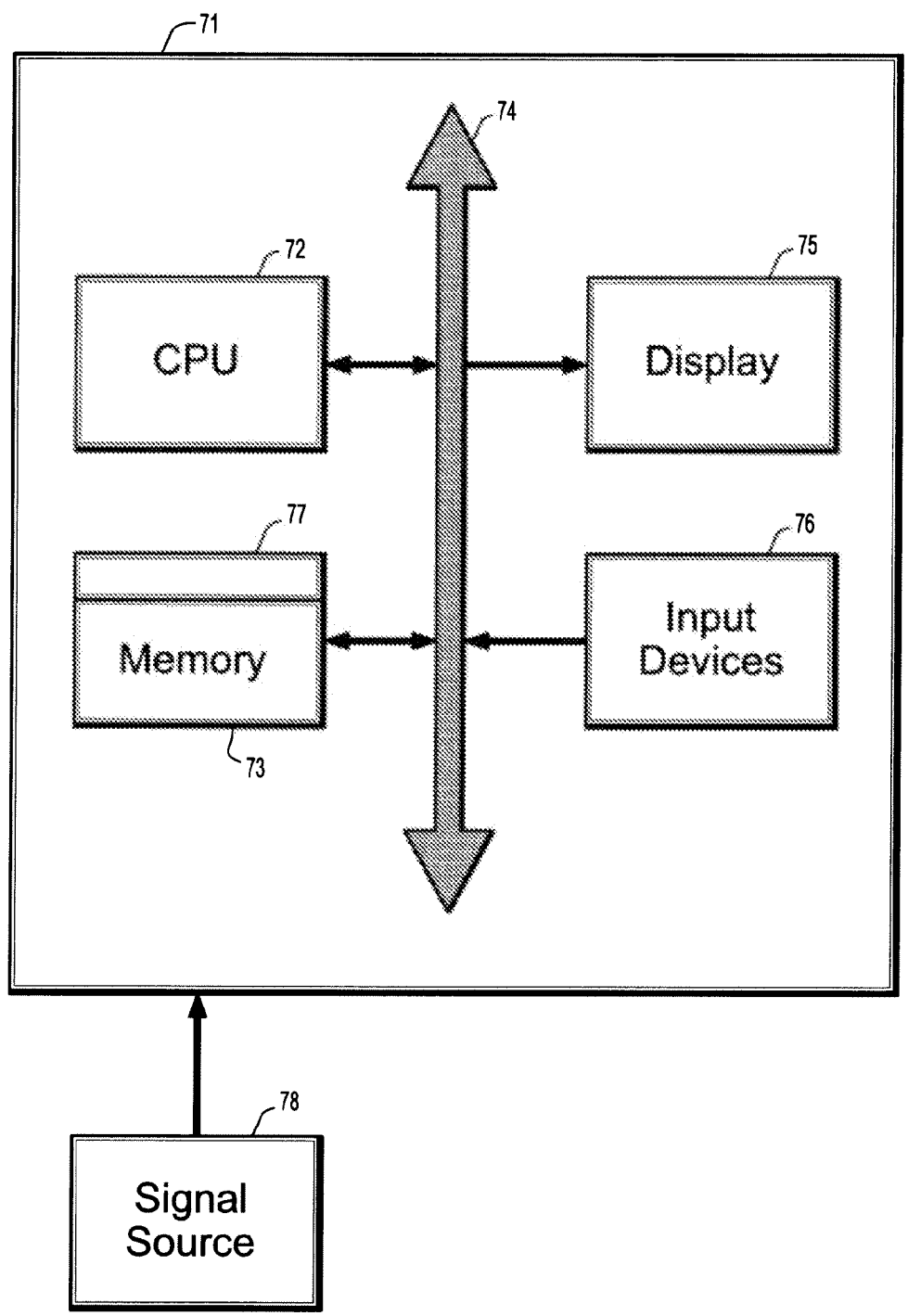
FIG. 7 is a block diagram of an exemplary computer system for implementing a virtual incision method for in-context volume visualization, according to an embodiment of the invention.

FIG. 7 is a block diagram of an exemplary computer system for implementing a virtual incision method for in-context volume visualization, according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of volume rendering a digitized medical image comprising the steps of:
    providing a digitized medical image volume, said image comprising a plurality of intensities represented as a 3-dimensional grid of points;
    providing a projection plane comprising a 2-dimensional lattice of points onto which rendering rays are projected from a viewing point through said image volume;
    advancing a sampling point along a ray through said image volume;
    using the position of the viewing point to automatically generate an incision region within said image volume, wherein said incision region has a fixed position and orientation with respect to the viewing point and viewing orientation, wherein said incision region is generated without segmenting said image volume;
    determining whether said sampling point is within said incision region, wherein a first transfer function is applied to a sample value interpolated from a first volume if said sampling point is within the incision region, and a second transfer function is applied to a sample value interpolated from a second volume if said sampling point is outside the incision region; and
    accumulating the output of the transfer function, wherein said steps of advancing a sampling point, generating an incision region, determining whether said sampling point is within said incision region, and accumulating the output are performed by a graphics processing unit.

2. The method of claim 1, wherein said incision region is a plane of finite thickness parallel to the ray direction, and determining whether said sampling point is within the incision region comprises evaluating a product of the position of the sampling point with an equation representing the incision plane.

3. The method of claim 1, wherein said incision region is a sphere of finite radius within said image volume, and determining whether said sampling point is within the incision region comprises evaluating a distance of the position of the sampling point to the center point of the sphere.

4. The method of claim 1, wherein said first volume and said second volume are the same.

5. The method of claim 1, further comprising determining whether said sampling point is on a boundary of said incision region.

6. The method of claim 5, further comprising applying a third transfer function to a sample value interpolated from a volume about said sampling point, if said sampling point is sufficiently close to said boundary.

7. The method of claim 5, further comprising interpolating an output on the boundary of said incision region from the output of said first transfer function and the output of the second transfer function.

8. The method of claim 1, wherein the output of the first transfer function either discards or makes the intensities of the first volume transparent with respect to the intensities of the second volume.

9. The method of claim 1, wherein the first transfer function deforms the volume about the sampling point z according to the transformation $$\Phi^{-1}(\vec{x}) = \vec{x} + \sum_{i,j,k \in \{0,1\}} a_{ijk}(\vec{x}) \cdot (-\vec{t}_{ijk})$$

determined by trilinear interpolation of translation vectors $\vec{t}_{ijk}$ given at the vertices of a grid sub-volume about said sampling point, and interpolation weights $a_{ijk}$ obtained from the undeformed image volume grid.

10. The method of claim 5, further comprising performing a curved multi-planar reconstruction (MPR) visualization at said incision boundary.

11. The method of claim 10, further comprising changing a viewing distance for said curved MPR visualization between rendering frames.

12. The method of claim 1, further comprising changing parameters characterizing said incision region during rendering, wherein said parameters include position and orientation of said incision region with respect to the viewing point, and the shape and size of said incision region.

13. A computer implemented method of volume rendering a digitized medical image comprising the steps of:
    providing a digitized medical image volume, said image comprising a plurality of intensities represented as a 3-dimensional grid of points;
    projecting a ray from a viewing point through said image volume onto a 2-dimensional projection plane wherein a sampling point is advanced along said ray;

using parameters characterizing said incision region to automatically generate;

an incision region within said image volume, wherein said incision region has a fixed position and orientation with respect to the viewing point and viewing orientation, wherein said incision region is generated without segmenting said image volume, wherein said parameters include position and orientation of said incision region with respect to the viewing point, and a shape and size of said incision region; and calculating a distance from said sampling point to a boundary of said incision region, wherein the steps of projecting a ray, automatically generating an incision region, and calculating a distance are performed by a computer processor further comprising using said distance to determine which of a plurality of sub-volumes contains said sampling point, wherein each of said plurality of sub-volumes is associated with a transfer function, and applying the transfer function associated with the sub-volume containing said sampling point to a sample value interpolated from said sub-volume; and accumulating the output of the transfer function along said ray.

14. The method of claim 13, further comprising interpolating the output of the plurality of transfer functions between said sub-volumes.

15. A program storage device readable by a computer, tangibly embodying a non-transitory program of instructions executable by the computer to perform the method steps for volume rendering a digitized medical image, the method comprising the steps of:

providing a digitized medical image volume, said image comprising a plurality of intensities represented as a 3-dimensional grid of points;

providing a projection plane comprising a 2-dimensional lattice of points onto ich rendering rays are projected from a viewing point through said image volume;

advancing a sampling point along a ray through said image volume;

using the position of the viewing point to automatically generate an incision region within said image volume, wherein said incision region has a fixed position and orientation with respect to the viewing point and viewing orientation, wherein said incision region is generated without segmenting said image volume;

determining whether said sampling point is within said incision region, wherein a first transfer function is applied to a sample value interpolated from a first volume if said sampling point is within the incision region, and a second transfer function is applied to a sample value interpolated from a second volume if said sampling point is outside the incision region; and accumulating the output of the transfer function.

16. The computer readable program storage device of claim 15, wherein said incision region is a plane of finite thickness parallel to the ray direction, and determining whether said sampling point is within the incision region comprises evaluating a product of the position of the sampling point with an equation representing the incision plane.

17. The computer readable program storage device of claim 15, wherein said incision region is a sphere of finite radius within said image volume, and determining whether said sampling point is within the incision region comprises evaluating a distance of the position of the sampling point to the center point of the sphere.

18. The computer readable program storage device of claim 15, wherein said first volume and said second volume are the same.

19. The computer readable program storage device of claim 15, the method further comprising determining whether said sampling point is on a boundary of said incision region.

20. The computer readable program storage device of claim 19, the method further comprising applying a third transfer function to a sample value interpolated from a volume about said sampling point, if said sampling point is sufficiently close to said boundary.

21. The computer readable program storage device of claim 19, the method further comprising interpolating an output on the boundary of said incision region from the output of said first transfer function and the output of the second transfer function.

22. The computer readable program storage device of claim 15, wherein the output of the first transfer function either discards or makes the intensities of the first volume transparent with respect to the intensities of the second volume.

23. The computer readable program storage device of claim 15, wherein the first transfer function deforms the volume about the sampling point according to the transformation $$\Phi^{-1}(\vec{x}) = \vec{x} + \sum_{i,j,k \in \{0,1\}} a_{ijk}(\vec{x}) \cdot (-\vec{t}_{ijk})$$

determined by trilinear interpolation of translation vectors $\vec{t}_{ijk}$ given at the vertices of a grid sub-volume about said sampling point, and interpolation weights $a_{ijk}$ obtained from the undeformed image volume grid.

24. The computer readable program storage device of claim 19, the method further comprising performing a curved multi-planar reconstruction (MPR) visualization at said incision boundary.

25. The computer readable program storage device of claim 24, the method further comprising changing a viewing distance for said curved MPR visualization between rendering frames.

26. The computer readable program storage device of claim 15, the method further comprising changing parameters characterizing said incision region during rendering, wherein said parameters include position and orientation of said incision region with respect to the viewing point, and the shape and size of said incision region.

27. The method of claim 1, wherein said first volume and said second volume are different.

28. The computer readable program storage device of claim 15, wherein said first volume and said second volume are different.

29. The computer readable program storage device of claim 13, wherein each of the plurality of sub-volumes is different.

* * * * *